*INVENTOR.*
JOHN W. VOTYPKA

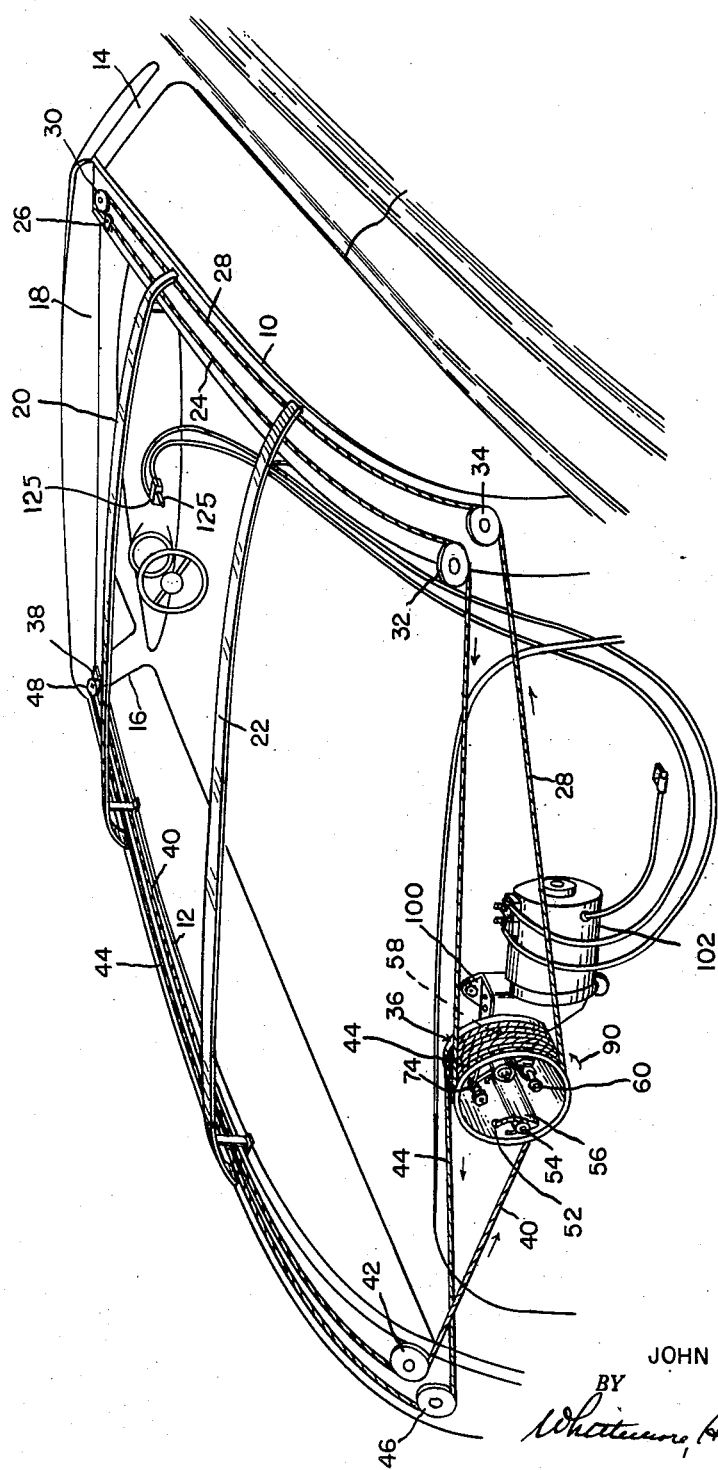

June 2, 1953 J. W. VOTYPKA 2,640,682
DRUM TYPE UNIT INSTALLATION
Filed Aug. 1, 1949 3 Sheets-Sheet 3

INVENTOR.
JOHN W. VOTYPKA
BY
Whittemore, Hulbert & Belknap
ATTORNEYS

Patented June 2, 1953

2,640,682

UNITED STATES PATENT OFFICE 2,640,682

DRUM TYPE UNIT INSTALLATION

John W. Votypka, Detroit, Mich., assignor to Detroit Harvester Company, Detroit, Mich., a corporation of Michigan Application August 1, 1949, Serial No. 107,847

5 Claims. (Cl. 254—141)

The present invention relates to a drum type unit installation and more particularly, to mechanism including a drum for effecting power manipulation of a collapsible top of a motor vehicle.

It is an object of the present invention to provide a drum type unit characterized by the simplicity and efficiency of the drum for effecting movement of control cables, and by the economy with which the structure may be produced.

It is a further object of the present invention to provide power means for manipulating the collapsible top of a motor vehicle comprising control cables for the top, the particular invention being specifically in the provision of a power driven drum, the construction of the drum, the means for mounting the drum, and the means for connecting the drum to motor means.

Other objects and features of the invention will become apparent as the description proceeds, especially when taken in conjunction with the accompanying drawings wherein:

Figure 1 is a fragmentary perspective view of the top of a vehicle.

Figure 2:
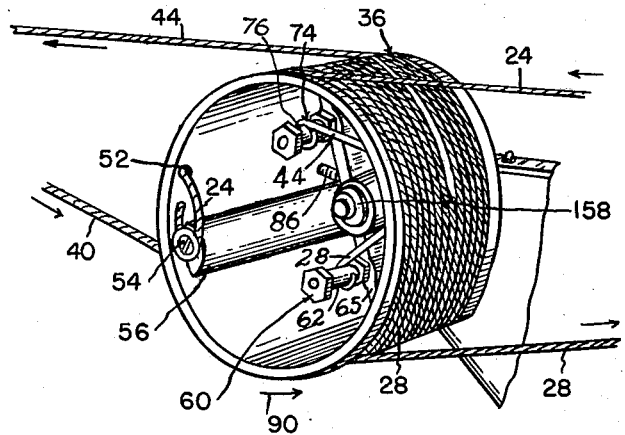
Figure 2 is an enlarged perspective view of the cable drum illustrated in Figure 1.

Referring now to Figures 1 and 2, there is illustrated the upper portion of a motor vehicle comprising curved roof rails 10 and 12 which at their front end are supported by front corner posts 14 and 16 respectively. Across the front end and between the roof rails 10 and 12 is a fixed header bar which in Figure 1 is concealed by a slidable header bar 18. The header bar 18 is provided with guide means cooperating with the roof rails 10 and 12 and is slidable therealong from a position adjacent the fixed header bar to a position adjacent the rear of the vehicle. In use, a flexible cover fabric (not shown) such for example as canvas or the like is secured adjacent its rear end to the rear of the vehicle and is secured adjacent its forward end to the movable header bar 18. Intermediate portions of the top fabric are secured to the slidable cross bows 20 and 22.

Means are provided for directly sliding the movable header bar 18 from the forward position shown in Figure 1 to a rear position which uncovers substantially the entire top of the vehicle. As illustrated in Figure 1 this means comprises a pair of cables. One of the cables comprises a portion 24 to which is rigidly clamped a bracket 26 extending rearwardly from the header bar 18, and it comprises a second generally parallel portion 28. Suitable pulleys or sheaves are provided, one such being indicated at 30 and located adjacent the front end of the roof rail 10. The cable portions 24 and 28 lead respectively around pulleys 32 and 34 and thence to the cable drum 36 which will be described in detail. In like manner, the opposite side of the movable header bar 18 is connected by a bracket 38 to a first cable portion 40 which passes around a pulley 42 and thence to the cable drum 36. The other portion 44 of the cable passes around a pulley 46 and thence to the cable drum 36. The cable portions 40 and 44 are separated by a pulley 48 located adjacent the front end of the roof rail 12.

Figure 5:
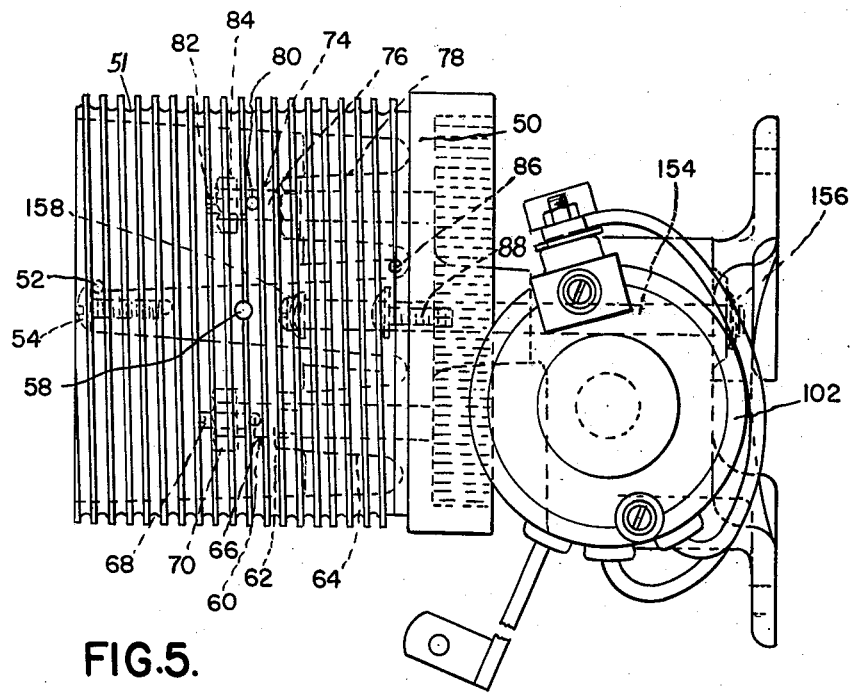
Figure 5 is a side elevation of the structure shown in Figure 3.
Figures 3, 4:
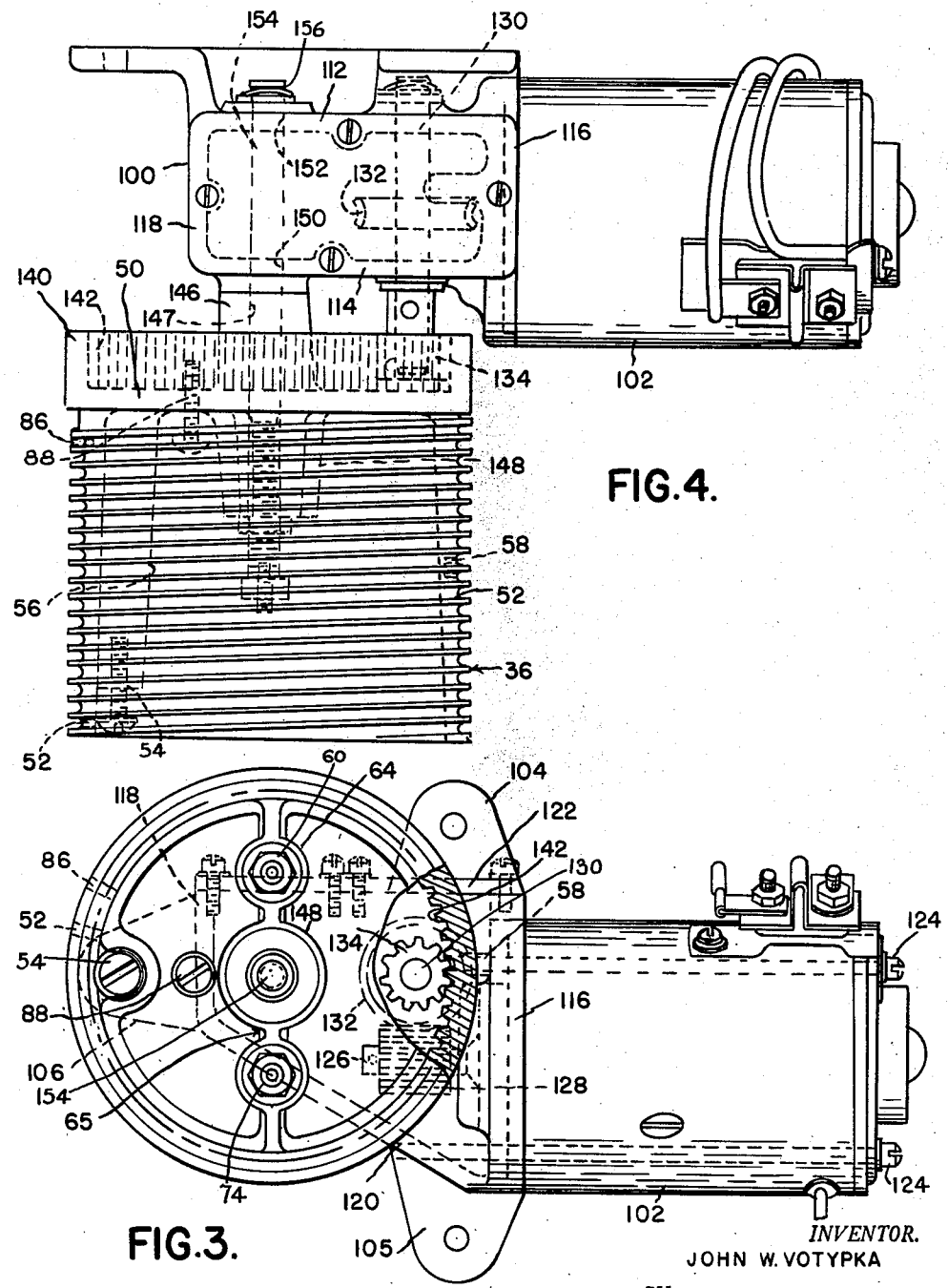
Figure 3 is a side elevation of the cable drum, mounting means and motor means therefor.
Figure 4 is a plan view of the structure shown in Figure 3.

Referring now to Figure 2 and Figures 3-5, the cable drum 36 is a relatively large hollow drum open at one end, the other end of the drum being closed by a transverse wall 50. The periphery of the drum 36 as best seen in Figures 4 and 5, is provided with a continuous helically disposed groove 51 which is of a size to accommodate the actuating cables and which groove is continuous from one end to the other of the drum.

The ends of the cables pass through lateral openings in the drum and are secured to clamping means located within the drum. Specifically, the cable portion 24, after passing around the pulley 32 as seen in Figure 2, is wound around the drum and its end portion extends through lateral opening 52 therein and is engaged by a clamping screw 54 threaded into a suitably tapped recess provided in an inwardly extending boss 56 located at the open end of the drum. As best seen in Figure 4 the boss 56 is preferably provided for the full length at the inside of the drum although this is not essential.

The cable portion 28 after passing around the pulley 34, is wound around the drum and then passes through a lateral opening 58 located substantially midway between the open end and the closed end of the drum. Inside the drum the cable 28 has its end secured to a clamping device 60. As best seen in Figures 2 and 5 the clamping device 60 comprises a post 62 threaded into a suitably tapped recess in a lateral enlarged boss 64 formed on a transverse rib 65. The post 62 is provided with an opening 66 and the end of the post is tapped for the reception of a clamping screw 68 which is held in place in clamped relation by means of a lock nut 70.

The cable portion 40 after passing around the pulley 46, is wound around the drum 36 and then extends into the drum through lateral opening 58 beside cable 28 where it is secured to a clamping device indicated generally at 74. The clamping device 74 is similar to the clamping device 60 as seen in Figures 2 and 5, and comprises a post 76 threaded into a suitably tapped recess in a laterally extending boss 78 formed on the transverse rib 65. The post 76 is provided with an opening 80 through which one end of the cable extends. A clamping screw 82 is provided in a tapped opening in the end of the post and is adapted to engage the cable. A locking nut 84 is provided to retain the screw 82 in adjusted position.

The cable 44 after passing around the pulley 42, is wound around the drum 36 and then passes through a lateral hole 86 where the end of the cable is secured to a clamping screw 88. As best seen in Figures 3 and 4 the clamping screw 88 is threaded into a tapped hole in the end wall 50 of the drum 36.

With the construction thus described and the parts in the position shown in Figure 1, rotation of the drum 36 in a counterclockwise direction as indicated by the arrow 90, will draw in on the cable portions 24 and 40, to which the brackets 26 and 38 respectively are clamped. At the same time the cable portions 28 and 44 are payed out at an equal rate due to the fact that the cables are wound in helical passages on the drum so that the drum is of constant effective diameter. Winding up the cables 24 and 40 on the drum has the effect of drawing the slidable header bar 18 rearwardly. As soon as the header bar reaches the cross bow 20 the cross bow will also slide rearwardly and will pick up the rear cross bow 22 and move it to the rear. When the direction of motion of the cables is reversed the header bar 18 is moved forwardly and the fabric secured thereto will successively pick up the cross bows 20 and 22 and move them to the position shown in Figure 1.

A unitary motor and drum assembly is provided and includes a combined transmission housing and bracket 100 on which a reversible electric motor 102 is mounted.

Referring now particularly to Figures 3–5 the transmission housing and bracket 100 is provided with three laterally extending flanges 104, 105 and 106 by means of which the bracket is mounted on a suitable portion of the vehicle. The bracket 100 has side walls 112 and 114, end walls 116 and 118, and a bottom wall 120. The open top of the transmission housing thus provided is closed with a removable cover plate 122.

The motor 102 is secured to the end wall 116 of the transmission housing portion of the bracket by elongated fastening screws 124, and is controlled by switch 125 on the dash.

As best seen in Figure 3 the spindle 126 of the motor has keyed or otherwise suitably secured thereto, a driving worm 128. Extending transversely between the side walls 112 and 114 of the transmission housing is a drive shaft 130, suitable bearings being provided where the shaft passes through the walls 112 and 114. Located between the walls 112 and 114 and keyed or otherwise suitably secured to the shaft 130 is a worm gear 132 which is in mesh with the worm 128. Located on the portion of the shaft 130 which projects beyond the wall 114 is a driving pinion 134.

The drum 36 at its closed end is provided with an axially extending annular peripheral flange 140 and the interior surface of the flange 140 is provided with internal teeth 142 adapted to mesh with the teeth of the driving pinion 130. On its exterior surface the end closure 50 of the drum has an outwardly extending boss 146 which is provided with an aperture 147 extending completely therethrough. Inside the drum 36 the transverse rib 65 has an axially extending boss 148 through which the aperture 147 extends.

In order to mount the drum 36 on the bracket 100, the walls 112 and 114 of the bracket are provided with aligned openings 150 and 152 in which is journalled a mounting shaft 154. The shaft 154 extends completely through the bracket 100 and also completely through the opening in the boss 146 on the drum to the interior of the drum. As best seen in Figures 2–5 the shaft 154 is provided at its ends with annular grooves in which suitable retaining clips 156 and 158 are secured.

The foregoing construction provides a very substantial support for the drum, since the drum in effect engages the mounting shaft 154 throughout the opening 147 which extends from one end of the top of the boss 148 to the opposite end of the boss 147. Moreover, the shaft 154 is given very strong support by the widely spaced bearings provided where it passes through the openings 150 and 152.

Referring again to the securing of the cables in the drum, the construction facilitates the initial assembly of the structure. The ends of the the clamping screws 54 and 88 respectively. cables 24 and 40 are initially clamped beneath the clamping screws 54 and 88 respectively. Thereafter the cable portions 28 and 44 are passed through the through openings in the posts 62 and 76 respectively and may be drawn up through these openings to secure the desired tension in the cables. Thereafter, the set screws 68 and 82 respectively are tightened down to clamp the cables in properly tensioned position after which the respective lock nuts are threaded down tightly.

The foregoing arrangement also provides for accurate maintainence of cable tension since all turns of the cables on the drum are at the same effective diameter due to the provision of the helical grooves therein. The grooves also of course prevent crossing over of cable turns on the drum. Moreover, the described connection of the cable ends to the drum provides for maximum of the drum. As one of the cable portions is unwound from the drum a second cable portion is wound thereon to occupy the space just vacated by the cable portion being unwound.

The foregoing construction provides a very simple mounting device which supports both the cable drum and the motor and provides a housing for the transmission means which drives the cable drum. Moreover, the bracket 100 includes a transmission housing portion within which all portions of the transmission except the drum driving pinion 134 are located.

The drawings and the foregoing specification constitute a description of the improved drum type unit installation in such full, clear, concise and exact terms as to enable any person skilled in the art to practice the invention, the scope of which is indicated by the appended claims.

What I claim as my invention is:

1. Cable drive means comprising a hollow cable drum having one closed end and one open end, helical cable guide grooves on the periphery of said drum, a pair of cables associated with said drum, an opening adjacent each end of said drum and an opening substantially midway between the ends of said drum, each cable having an end extending through one of said openings adjacent the end of the drum, and the other end extending through the opening midway between the ends of said drum, clamping means within said drum comprising a boss adjacent the open end of said drum having a tapped hole therein, a tapped hole at the closed end of said drum, clamping screws in said tapped holes, a pair of posts extending axially inwardly of said drum from the closed end thereof, said posts having transverse cable-receiving openings adjacent their free end and clamping screws threaded into the free ends of said posts to engage portions of cable received in said transverse openings.

2. A drum for driving a pair of cables, said drum having an open end and a closed end, a transverse rib diametrically disposed on the inside of the closed end of said drum, said rib having a central laterally extending boss, an opening extending through said boss axially of said drum for receiving a shaft for mounting said drum for rotation, said rib being provided with laterally extending bosses at opposite sides of said central boss, said last mentioned bosses having openings therein extending parallel to the axis of said drum, posts in said last mentioned openings, and means on said posts for securing cable ends thereto.

3. A drum as defined in claim 2, said drum having an inwardly extending boss adjacent its open end on its inner wall, a tapped opening therein for receiving a cable clamping screw, said drum having a tapped opening in its closed end at the same side as said last mentioned boss for receiving a cable clamping screw, said drum having three radially extending openings through its side wall, one of said last mentioned openings being adjacent the open end of said drum to admit a cable end for engagement with a screw in the inwardly extending boss, another of said last mentioned openings being midway between the ends of the drum to admit two cable ends for engagement with said posts, and the third of said last mentioned openings being adjacent the closed end of said drum to admit a cable end for engagement by a screw in the opening in the closed end of said drum.

4. A self-contained cable drive assembly comprising a hollow bracket having spaced opposed walls, a drum shaft journalled in both of said walls and extending outwardly beyond one of said walls, a drive shaft parallel to said drum shaft and journalled in both of said walls and extending outwardly beyond said one wall, a hollow drum having an open end remote from said bracket and a closed end wall adjacent said bracket, means on said closed end wall mounting said drum on said drum shaft, said drum having an annular projection extending toward said bracket from said end wall, gear teeth on the inner side of said projection, a pinion on said drive shaft meshing with said gear teeth, a motor carried by said bracket and having a shaft extending into said bracket and gearing connecting said drive shaft and motor shaft.

5. Structure as defined in claim 4 comprising a pair of cables each having end portions wrapped around said drum, said drum having radial openings through its side walls, the ends of said cables extending through said openings, and clamping means within said drum engaging the ends of said cables.

JOHN W. VOTYPKA.

References Cited in the file of this patent

UNITED STATES PATENTS

| Number | Name | Date |
|---|---|---|
| 789,715 | Cassidy | May 16, 1905 |
| 806,401 | Dawson | Dec. 5, 1905 |
| 1,459,032 | Norling | June 19, 1923 |
| 1,545,545 | Brey | July 14, 1925 |
| 2,250,269 | Lockwood | July 22, 1941 |
| 2,331,763 | Capps | Oct. 12, 1943 |

FOREIGN PATENTS

| Number | Country | Date |
|---|---|---|
| 372,904 | Germany | Apr. 4, 1923 |